United States Patent
Leclerc et al.

(10) Patent No.: US 11,525,805 B2
(45) Date of Patent: Dec. 13, 2022

(54) NON-CONTACT SPEED ENCODER

(71) Applicant: Olympus NDT Canada Inc., Québec (CA)

(72) Inventors: Rémi Leclerc, Quebec (CA); Benoit Lepage, L'Ancienne-Lorette (CA); Charles Brillon, Quebec (CA)

(73) Assignee: Olympus NDT Canada Inc., Québec (CA)

( * ) Notice: Subject to any disclaimer, the term of this patent is extended or adjusted under 35 U.S.C. 154(b) by 86 days.

(21) Appl. No.: 16/891,338

(22) Filed: Jun. 3, 2020

(65) Prior Publication Data

US 2021/0382010 A1    Dec. 9, 2021

(51) Int. Cl.
G01N 27/90 (2021.01)
G01N 27/904 (2021.01)
G01P 3/80 (2006.01)

(52) U.S. Cl.
CPC ......... *G01N 27/906* (2013.01); *G01N 27/904* (2013.01); *G01N 27/9006* (2013.01); *G01N 27/9066* (2013.01); *G01P 3/803* (2013.01)

(58) Field of Classification Search
CPC .. G01P 3/803; G01N 27/906; G01N 27/9006; G01N 27/904; G01N 27/9066
USPC ....................................................... 324/242
See application file for complete search history.

(56) References Cited

U.S. PATENT DOCUMENTS

| | | | |
|---|---|---|---|
| 4,761,610 A * | 8/1988 | Svegander | G01N 27/9013 324/240 |
| 5,140,265 A * | 8/1992 | Sakiyama | G01N 27/902 324/240 |
| 6,364,835 B1 * | 4/2002 | Hossack | G01S 7/52034 600/443 |

FOREIGN PATENT DOCUMENTS

DE    202018107011 U1 *   2/2019    ............... G01P 3/66

OTHER PUBLICATIONS

Engelberg et al.; "Eddy current sensor system for non-contact speed and distance measurement of rail vehicles"; Pub. Date Aug. 21, 2000; WIT Transactions on The Built Environment; pp. 1261-1270 (Year: 2000).*

(Continued)

*Primary Examiner* — Judy Nguyen
*Assistant Examiner* — Rahul Maini
(74) *Attorney, Agent, or Firm* — Schwegman Lundberg & Woessner, P.A.

(57) ABSTRACT

An eddy current (EC) detection system comprises an EC probe including a plurality of sensors to provide corresponding EC response signals; and processing circuitry to evaluate speed of the EC probe based on a measurement of similarity of the EC response signals; determine whether the speed of the EC probe is too fast or two slow based on quality of the measurement; and generate a command to adjust speed of the EC probe during further EC inspection.

25 Claims, 6 Drawing Sheets

(56) References Cited

OTHER PUBLICATIONS

Hensel et al.; "Probabilistic Rail Vehicle Localization With Eddy Current Sensors in Topological Maps"; Pub. Date Dec. 4, 2011; IEEE Transactions on Intelligent Transportation Systems; vol. 12, No. 4; pp. 1525-1536 (Year: 2011).*

Dovis et al.; "Magnetic Sensor Array System: an Innovative Approach to Train Localization"; Pub. Date Apr. 2019; Master Thesis at Politecnico Di Torino (Year: 2019).*

Hensel et al.; "Eddy current sensor based velocity and distance estimation in rail vehicles"; Pub. Date Oct. 1, 2015; IET Science, Measurements & Technology; pp. 1-7 (Year: 2015).*

Engelberg; "Design of a correlation system for speed measurement of rail vehicles"; Pub. Date 2001; Measurement; vol. 29, Issue 2; pp. 157-164 (Year: 2001).*

* cited by examiner

NON-CONTACT SPEED ENCODER

FIELD OF THE INVENTION

The present invention relates to eddy current (EC) probes for detecting defects within components, more specifically to methods for evaluating acceleration, speed and position of EC probes during detection operations.

BACKGROUND OF THE INVENTION

EC inspection is commonly used to non-destructively detect flaws in manufactured components fabricated from a conductive material, such as bars and tubes. During inspection, the speed and position of the EC probe can be useful for assessment of inspection quality and for determining the exact location of defects. EC probe speed can also be used for signal processing, for example for determining cutoff frequency of filters. Devices (e.g., encoders) that rely on physical contact with the EC probe are currently used for obtaining position and speed information; however, usefulness of these devices can be limited in environments in which the component being inspected is covered with mud or other substances. Therefore, there is an ongoing need for other methods for detecting speed and position of an EC probe during EC inspection.

SUMMARY OF THE INVENTION

In example implementations of the present disclosure, an eddy current (EC) system is provided. The EC system comprises an EC probe including a plurality of sensors to provide corresponding EC response signals. The EC system includes processing circuitry to evaluate speed of the EC probe based on a measurement of similarity of the EC response signals and to encode a command to adjust speed of the EC probe during further EC inspection, based on the evaluation. Control circuitry coupled to the processing circuitry can control speed of the EC inspection system responsive to receiving the command.

DETAILED DESCRIPTION OF THE INVENTION

Eddy current (EC) testing is used in non-destructive testing (NDT) of components comprised of conductive (either ferromagnetic or non-ferromagnetic) material. Generally, EC testing is conducted with an EC probe that comprises one or a multiplicity of individual EC sensors, each individual EC sensor comprising EC coils. Some of the coils are configured as driver coils, which create a primary magnetic field that penetrates a test object and generates eddy currents. Other coils are configured as sensing coils which detect a net magnetic field resulting of the primary field and the secondary magnetic fields generated by eddy currents in the test object. In some implementations, the same coil can simultaneously serve both driver and sensing functions. Changes in secondary magnetic field (and therefore changes in the eddy current) can indicate defects in the test object.

Figure 1:
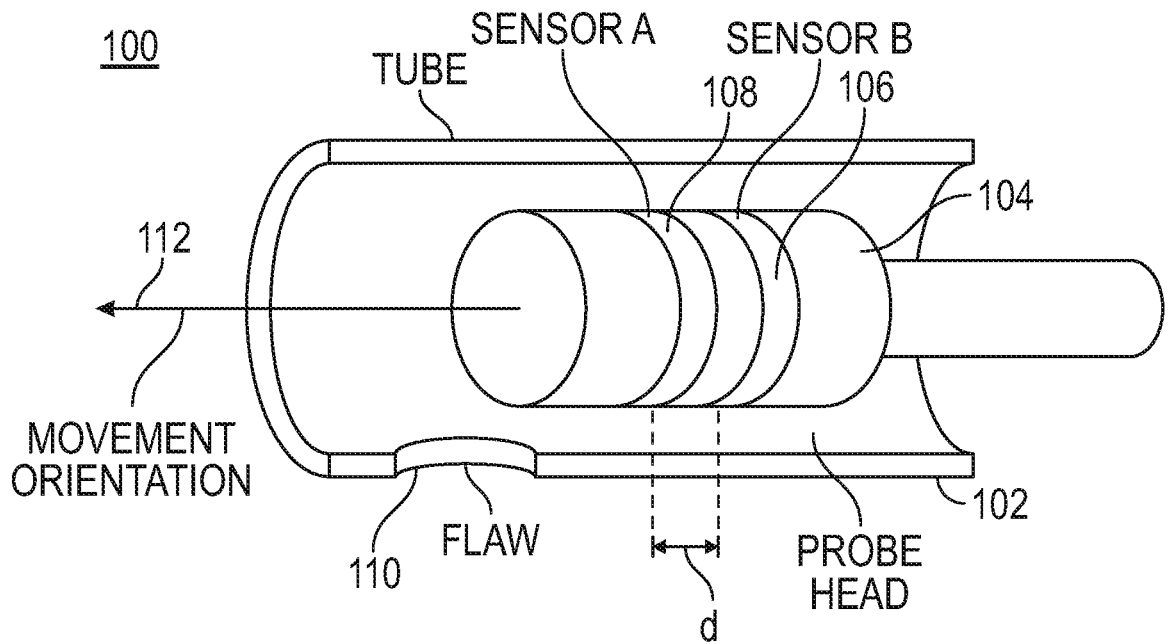
FIG. 1 is a block diagram of a system in which methods of the present disclosure may be implemented.

FIG. 1 is a block diagram of an eddy current (EC) inspection system 100 in which methods of the present disclosure may be implemented. The EC inspection system 100 can include an EC probe 104. During inspection of a test object 102, in some implementations, the EC probe 104 is inserted into the test object 102 and moves at a speed within the test object 102 according to movement orientation 112. When a flaw 110 exists in the test object 102, the nature of the eddy current changes (e.g., the magnitude or distribution of the eddy current changes). Accordingly, by detecting changes in the eddy current, it is possible to detect whether a defect (e.g, a crack, roughness, etc.) is present in the test object 102.

The EC probe 104 can include a plurality of coils 106, 108 as shown, separated a known distance d. Coils 106, 108 can be wound around a core. EC responses can be generated at each coil 106, 108. A differential signal can be computed by subtracting the EC responses generated at each coil 106, 108 at various points in time. While two coils 106, 108 are shown, it will be appreciated that the EC probe 104 can include more than two coils in some implementations. For example, the EC probe 104 can comprise an EC probe with at least three coils. Furthermore, the EC probe 104 can be configured in other than round configurations. For example, an eddy current array configuration (not shown in FIG. 1) could be used, in which each eddy current array sensor includes two coils aligned with the inspection direction to reproduce multiple EC response signal patterns. In yet another configuration, some coils could be used to measure EC probe 104 velocity while other coils are used for test object 102 inspection only. Finally, rather than being inserted into the test object 102 as shown in FIG. 1, the EC probe 104 can be used to scan the outside of a test object 102.

Figure 2:
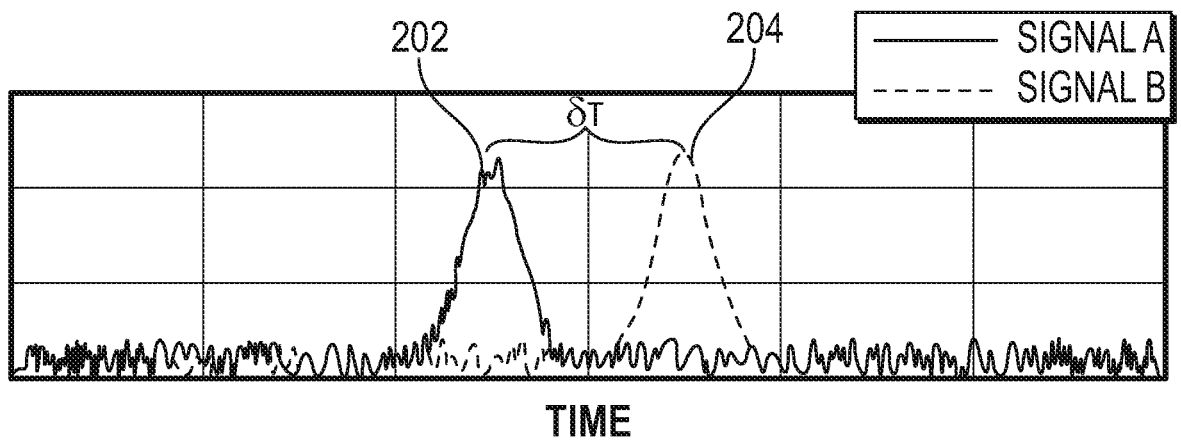
FIG. 2 illustrates EC response signals according to some implementations of the present disclosure.

The coils 106, 108 generate EC response signals, which can be identical (based on a differential signal computed, for example, processing circuitry local or remote to the EC probe 104 but spaced one after another in time as depicted in FIG. 2. Signal 202 represents an EC response signal that can be generated on a first coil (e.g., coil 106) and signal 204 represents an EC response signal that can be generated on a second coil (e.g., coil 108). Depending on the design, scan direction or other parameter related to the EC probe 104, the order (in time) of signals 202 and 204 may be reversed. A time delay $\delta_t$ between signal 202 and 204 can be observed and used in conjunction with a known distance d between coils 104, 106 to determine the speed of the EC probe 104. Knowing the speed of EC probe 104, locations of defects can be determined, and speed can be optimized to improve inspection quality as described in more detail herein.

Figure 3:
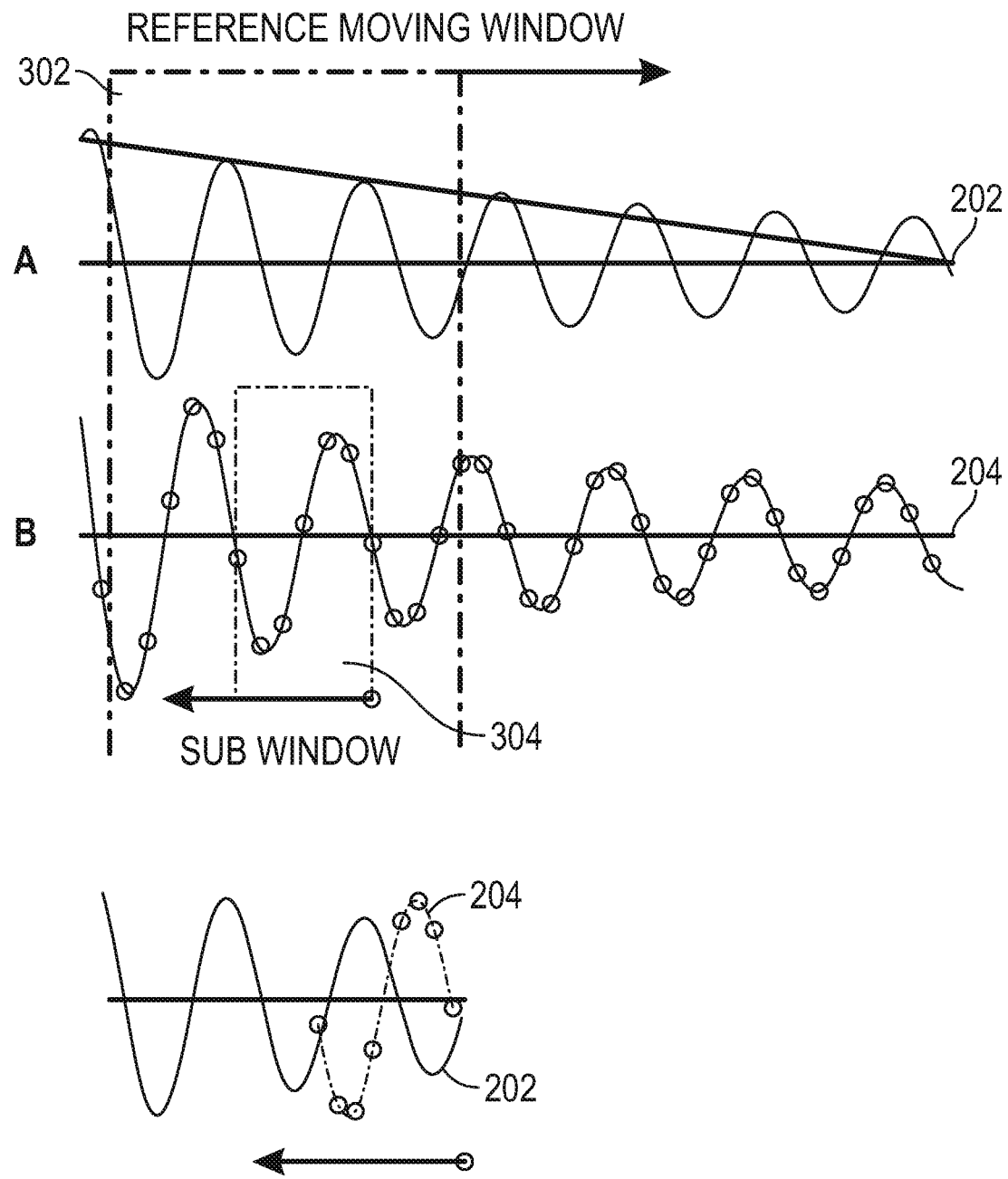
FIG. 3 illustrates sweeping of a sub-window within a reference window for determining signal cross-correlation according to the present disclosure.

The value for the time delay $\delta_t$ between signal 202 and signal 204 can be determined by analyzing the signals 202, 204 within time windows as shown in FIG. 3. Assuming that the speed of EC probe 104 (FIG. 1) is constant within a reference window 302, the sweep distance of the sub-window 304 to achieve maximum signal cross-correlation between signals 202, 204 indicates the amount of time delay $\delta_t$ between the signals 202, 204.

In some implementations, cross-correlation C is calculated, for example by processing circuitry local or remote to the EC probe 104 (e.g., processing circuitry 702 (FIG. 7)), as given by Equation (1):

$$c(i, j) \equiv \frac{\sum_{\xi=0}^{N_B-1} A^*_{i+\xi+j} B_{i+\xi}}{\sqrt{\sum_{\xi=0}^{N_B-1} A^*_{i+j+\xi} A_{i+j+\xi}} \sqrt{\sum_{\xi=0}^{N_B-1} B^*_{i+\xi} B_{i+\xi}}} \quad (1)$$

where A and B represent channels over which the EC response signals are obtained and where A* and B* are convolutions of respective A and B signals; $i \in [0, N-1]$ and $j \in [-(N_A-1), (N_A-1)]$ where N corresponds to the number of points in the signal to be examined, according to $$N \equiv \frac{\Delta T}{\Delta t} + 1$$

with $\Delta T$ being the length in time of the signal to be examined. $N_B$ is the number of points in the time window (e.g., sub-window 304) of length $\Delta t_B$ (used with channel B) and is given by $$N_B \equiv \frac{\Delta t_B}{\Delta t} + 1.$$

$$N_A \equiv \frac{\Delta t_A}{\Delta t} + 1,$$

where $\Delta t_A$ is the amount of tune by which the window of length $\Delta t_B$ can slide to the left and to the right with respect to the $i^{th}$ position.

$$\Delta t = \frac{1}{f}$$

where f is a data acquisition rate.

Processing circuitry 702 determines a value for $\tau_j$ a time $t_i$ that maximizes the cross-correlation function, such that:

$$\delta_t = \tau_{max}(t_i) = \arg\max_\tau c(t_i, \tau_j) \quad (2)$$

Speed of the EC probe 104 at all points is then given by dividing distance between the coils d according to:

$$v(t_i) = d \frac{1}{\tau_{max}(t_i)}$$

While eddy currents are often expressed using complex-number notation (i.e., including real and imaginary components), only the real portion of that complex value is used in example implementations. As will be appreciated, therefore, $c(t_i, \tau)$ will typically be expressed as complex signals. However, in some implementations, just the real part (e.g., $Re[c(t_i, \tau_j)]$ of the complex signal is used in computing delay according to Equation (2). In other words, Equation (2) may be written as:

$$\delta_t = \tau_{max}(t_i) = \arg\max_\tau Re[c(t_i, \tau_j)] \quad (2b)$$

In some implementations, eddy currents may be expressed using polar representation to provide information on amplitude and phase of observed eddy currents, which can in turn give information on size of the defect 110 and whether the defect 110 is inside or outside the test object 102. The EC probe 104 can be designed to reduce effects of lift-off. Lift-off is the impedance change that occurs when there is variation in the distance between the EC probe 104 and the test object 102. The lift-off variation can be caused by varying coating thicknesses, irregular sample surfaces, or operator movements, for example. Lift-off can adversely affect EC detection because lift-off can conceal defect 110 responses when, for example, lift-off is in the same direction as the defect 110. EC probe 104 shape can be designed and operated based on excitation signal frequency, or normalization techniques can be applied, to improve distinction between lift-off and actual defects in a test object.

Figure 4:
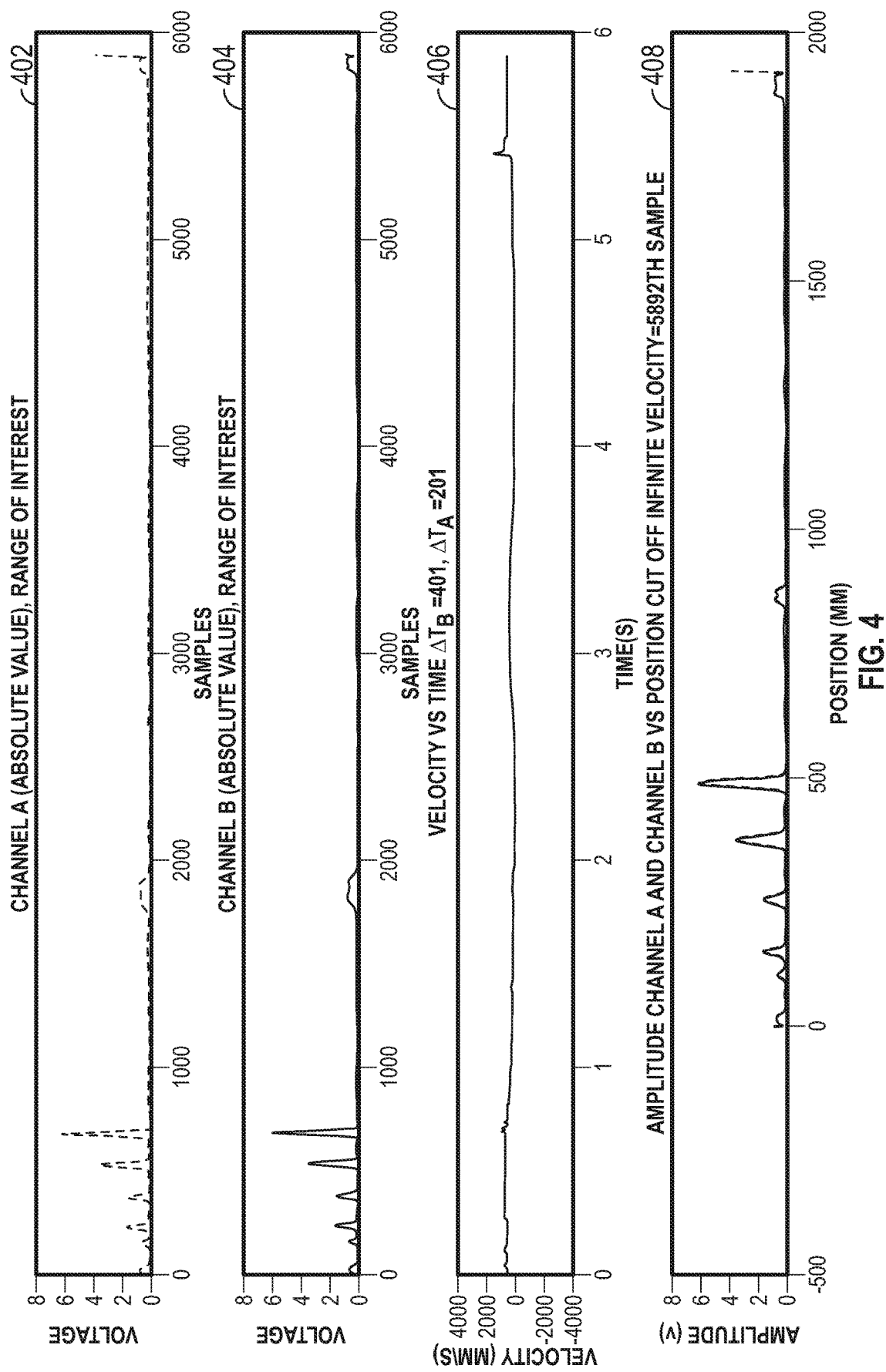
FIG. 4 illustrates EC response signals, speed of an EC probe, and superimposition of EC response signals within a window, according to the present disclosure.

FIG. 4 illustrates EC response signals, speed of an EC probe, and superimposition of EC response signals within a window, according to some implementations. Graph 402 and graph 404 illustrate EC response signals such as can be generated by coils (e.g., coil 106 and coil 108, respectively) during an inspection process. It will be noted that peaks in graphs 402 and 404 are slightly shifted in time, reflecting time delay $\delta_t$ as described earlier herein with respect to FIG. 2 and FIG. 3. Graph 406 illustrates a speed evaluation (using, e.g., Equations (1), (2), and (3)) calculated based on the signals illustrated in graph 402 and graph 404, given example values of $\Delta t_B$ and $\Delta t_A$ of 401 milliseconds and 201 milliseconds, respectively. The speed evaluation reflects detection for backward movement of the respective EC probe during inspection. The width of the cross-correlation windows (e.g., reference window 302 and sub-window 304 (FIG. 3)) will affect the smoothness and other characteristics of graph 406, and selection thereof is based on parameters including distance between sensors (e.g., coil 106 and coil 108), acquisition speed, EC probe speed, and other parameters. Graph 408 illustrates an implementation of superimposing graph 402 and 404 based on the speed evaluation.

Figure 5:
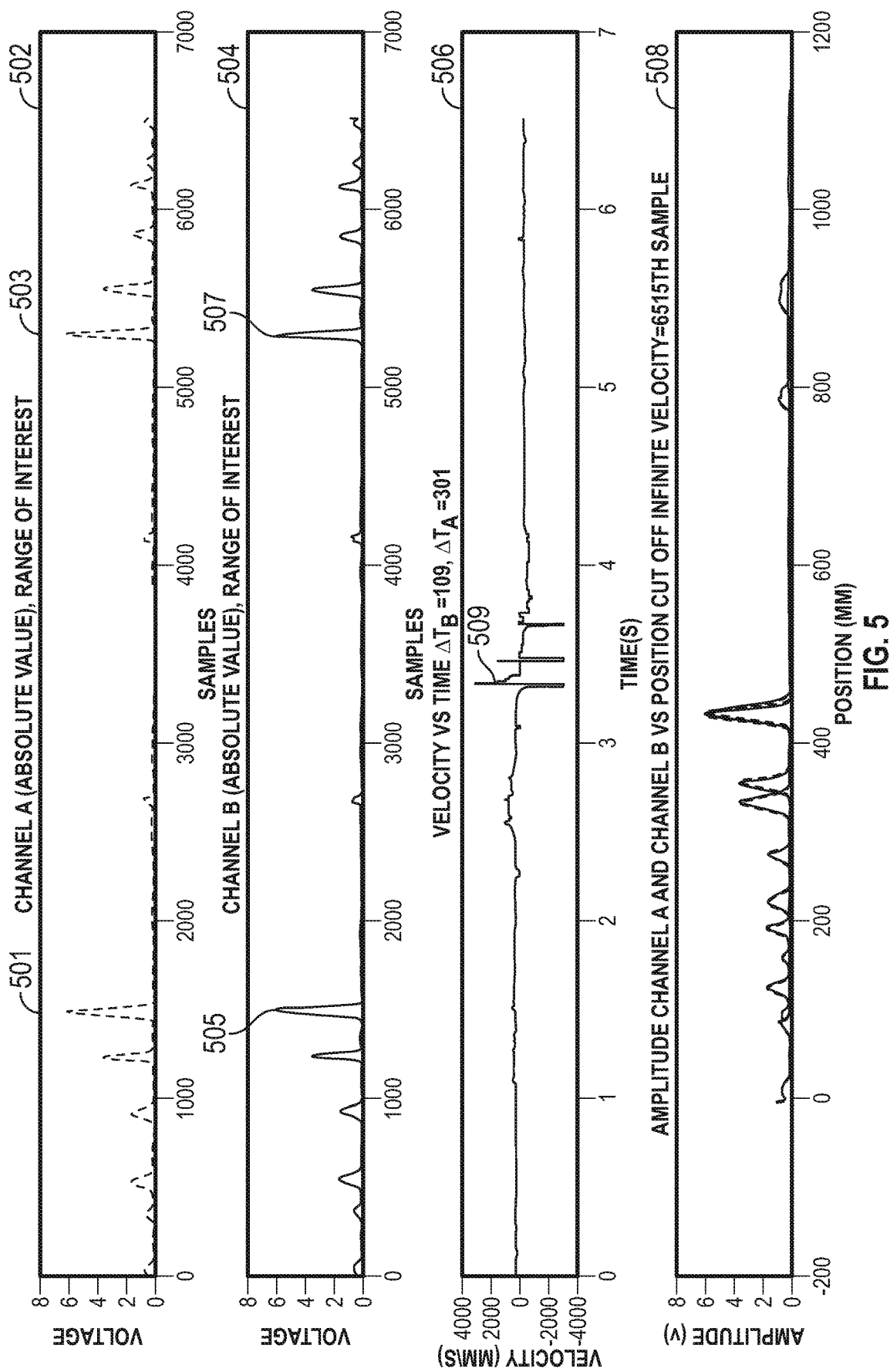
FIG. 5 illustrates EC response signals, speed of an EC probe during both push and pull operations in EC inspection, and superimposition of EC response signals within a window, according to the present disclosure.

FIG. 5 illustrates EC response signals, speed of an EC probe during both push and pull operations in EC inspection, and superimposition of EC response signals within a window, according to the present disclosure. Graph 502 and graph 504 illustrate EC response signals such as can be generated by coils (e.g., coil 106 and coil 108, respectively)

during an inspection process. Inspection during both pushing of the EC prob 104 and pulling of the EC probe 104 are illustrated. For example, in graph 502, peaks 501 can be generated as the EC probe 104 is pushed into test object 102, and peaks 503 can be generated as the EC probe 104 is pulled out from test object 102. Similarly, in graph 504, peaks 505 can be generated as the EC probe 104 is pushed into test object 102, and peaks 507 can be generated as the EC probe 104 is pulled out from test object 102. It will be noted that peaks in graphs 502 and 504 are slightly shifted in time, reflecting time delay $\delta_t$ as described earlier herein with respect to FIG. 2 and FIG. 3. Graph 506 illustrates results of a speed evaluation (using, e.g., Equations (1), (2), and (3)) calculated based on the signals illustrated in graph 502 and graph 504, given example values of $\Delta t_B$ and $\Delta t_A$ of 109 milliseconds and 301 milliseconds, respectively. The speed evaluation reflects detection for backward and forward movement of the respective EC probe during inspection. Peaks 509 illustrates the speed signal when the operator switches from pushing to pulling (or vice versa) during EC detection. The width of the cross-correlation windows (e.g., reference window 302 and sub-window 304 (FIG. 3)) will affect the smoothness and other characteristics of graph 506, and selection thereof is based on parameters including distance between sensors (e.g., coil 106 and coil 108), acquisition speed, EC probe speed, and other parameters. Graph 508 illustrates an implementation of superimposing graph 502 and 504 based on the speed evaluation.

Figure 6:
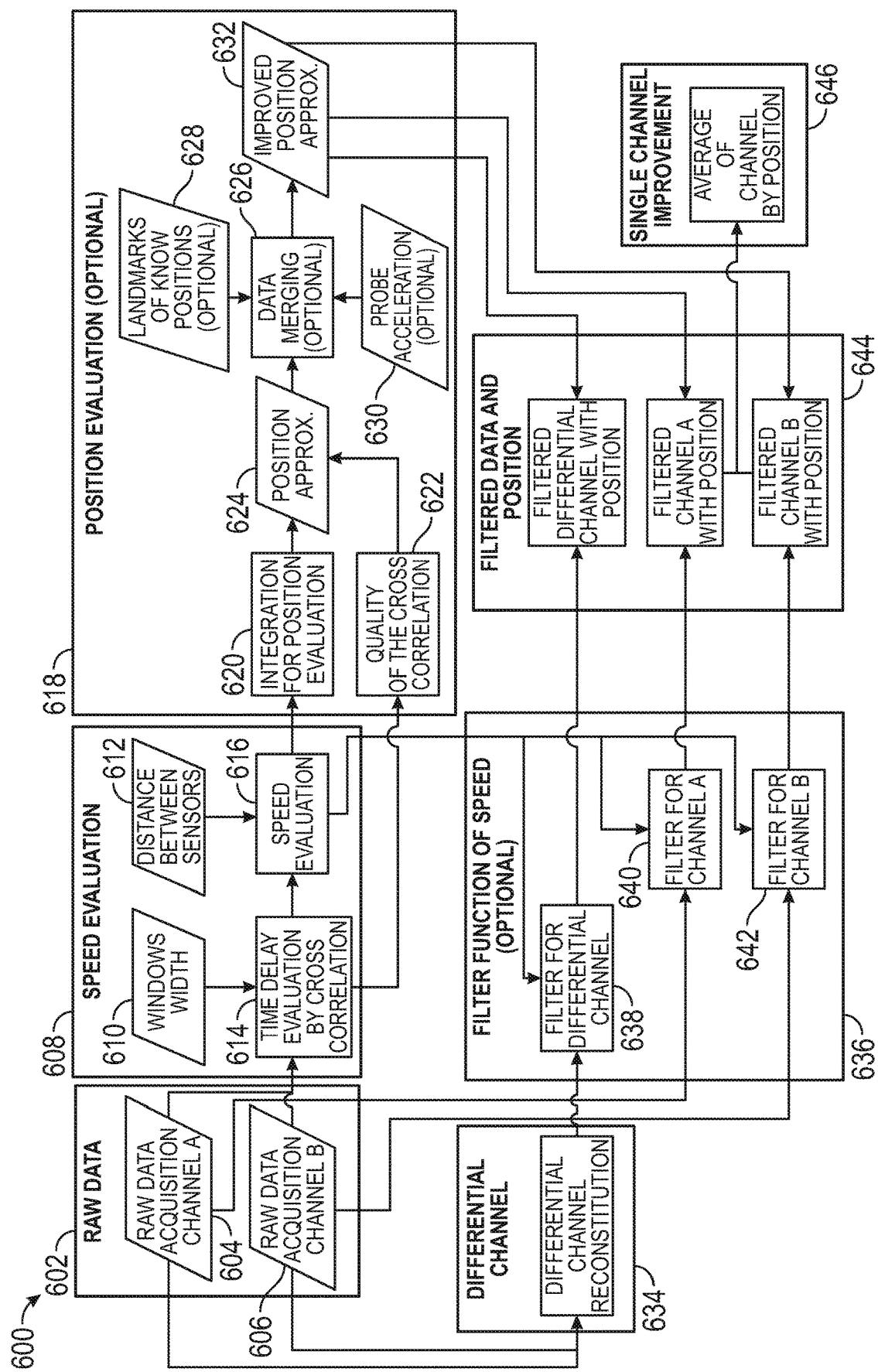
FIG. 6 is a flow diagram illustrating a speed and position evaluation process according to the present disclosure.

FIG. 6 is a flow diagram illustrating operations of a speed and position evaluation process 600 according to the present disclosure. Operations of process 600 can be performed by the EC probe 104 (FIG. 1) or elements that can be collocated with or remote from the EC probe 104 including processing circuitry (e.g., processor 702 (FIG. 7)) or memory (e.g., main memory 704 (FIG. 7)).

At operation 602, the EC probe 104 can acquire raw data (e.g., EC response signals), including at least raw data 604, 606 received from EC sensors or coils 104, 106.

At operation 608, processor 702 can evaluate speed of the EC probe 104. Speed evaluation can include using window width 610 as described earlier herein and raw data from operation 602 to compute time delay T using cross-correlation at 614 or other logical computation that can measure similarity of raw data acquired through multiple channels. The cross-correlation and time delay τ computation can proceed as described above with respect to Equations (1)-(2). The computed time delay T can be used, with the input 612 distance between sensors to calculate speed at operation 616 according to Equation (3). Speed evaluation 616 can also use information regarding noise within the test object 102. For example, the frequency of the noise signal can vary based on speed of the EC probe 104 and further based on the test object 102 material. Speed evaluation can further include determining if the speed is too fast or too slow; for example if noise is too loud or if defects are missed.

In operation 618, processing circuitry can evaluate the position of the EC probe 104. Based on the speed evaluation 616, the processing circuitry can perform a mathematical operation (e.g., integration of speed) at operation 620 to obtain position information. Quality of the cross-correlation (according to window size or acquisition rate) can also be evaluated at operation 622 based on the time delay r computed at operation 614. The results of operations 620 and 622 can be used to approximate a position at operation 624. Further refinement can be made at operation 626 by merging data 628 from known landmarks and knowledge of EC probe 104 acceleration 630, among other possible inputs.

Data 628 from known landmarks can be retrieved from heat exchanger maps, for example. Knowledge of EC probe 104 acceleration 630 can be obtained through mathematical calculation (e.g., taking a derivative) based on speed of the EC probe 104 or by external means such as an Inertial Measurement Unit (IMU) device in the probe head. The improved speed approximation 632 can be provided to subsequent processes to control movement and speed of the EC probe 104, to improve signal quality, to improve further speed evaluations, etc. Furthermore, using multiple test frequencies (e.g., two or more test frequencies) for the speed measurement can improve precision of speed measurement and detection.

Raw signal data 604, 606 can also be provided as inputs to operation 634 in which processing circuitry recreates differential channel information. The differential channel information 634, as well as the raw data 604, 606 can be provided to filter functions 636 of speed. Frequency of the EC response signals 202, 204 will vary depending on the speed at which the EC probe 104 is being pushed or pulled within test object 102. Therefore, parameters for high-pass and low-pass filtering must be considered such that noise is reduced while ensuring that defects can still be detected. The parameters should be selected knowing the speed of the EC probe 104 and knowing the properties of materials of the test object 102. Filtered speed outputs 638, 640 and 642, as well as improved position approximations 632 can be provided to position filtering operations 644.

Outputs of filtering operations 644 can be provided for improvement operations 646. For example, improvements can include adjusting speed of the EC probe 104 during further EC inspection to maximize speed of the EC probe 104 while maintaining full inspection of the test object 102 surface. For example, speed may be adjusted to be faster or slower if the speed is determined to be too fast or too slow. Averaging methods can be applied, knowing position of each EC sensor/coil 104, 106 to improve the quality of the signal.

Figure 7:
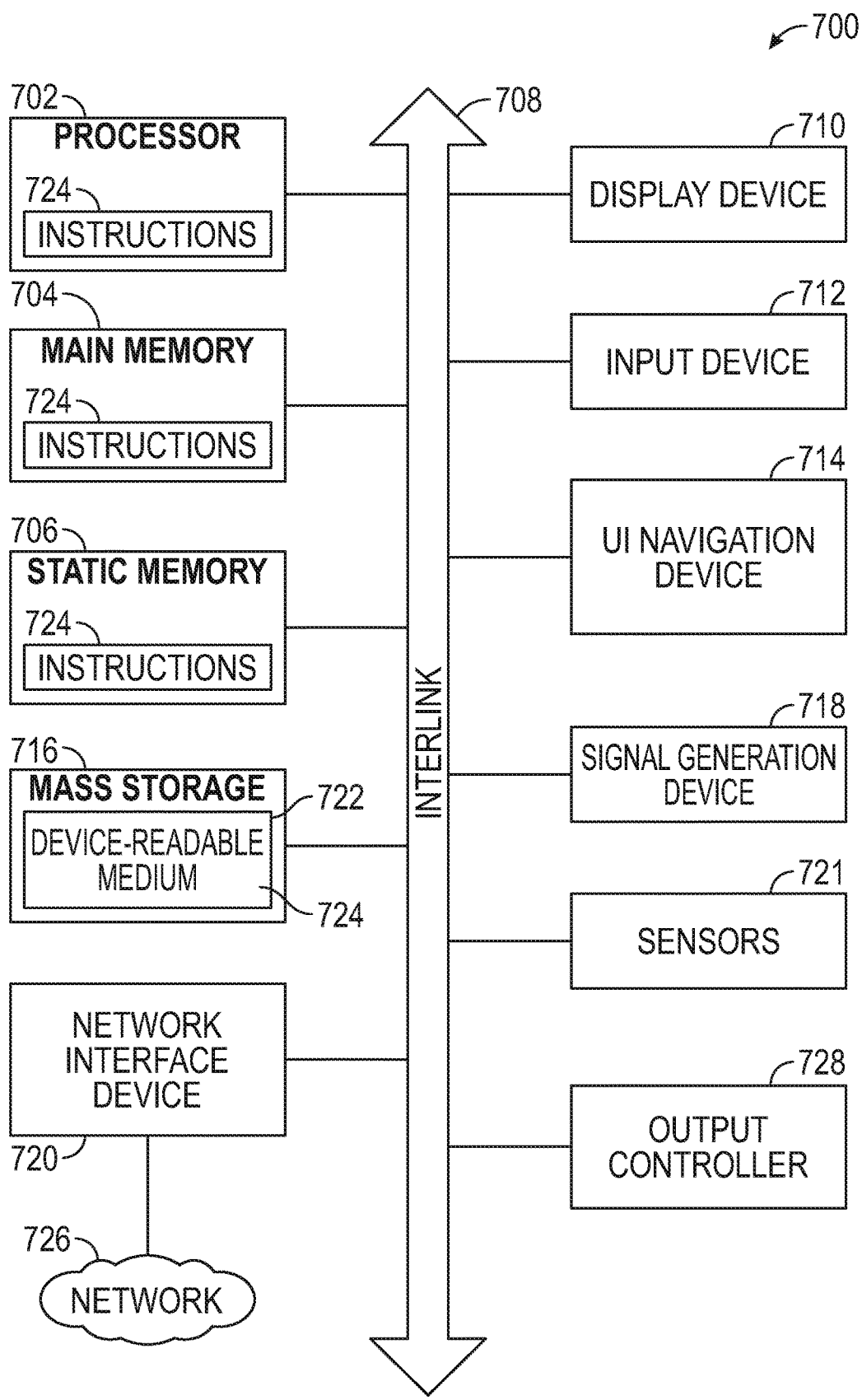
FIG. 7 illustrates a block diagram of an example machine upon which any one or more of the techniques (e.g., methodologies) discussed herein may perform. In alternative implementations, the machine may operate as a standalone device or may be connected (e.g., networked) to other machines.

FIG. 7 illustrates a block diagram of an example machine 700 upon which any one or more of the techniques (e.g., methodologies) discussed herein may perform. In alternative aspects, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be, or be a part of, a communications network device, a cloud service, a personal computer (PC), a tablet PC, a personal digital assistant (PDA), a mobile telephone, a smart phone, or any machine capable of executing instructions (sequential or otherwise) that specify actions to be taken by that machine. Some components of the machine 700 (e.g., processing circuitry 702) may be collocated with the EC probe 104 (FIG. 1).

In some aspects, the machine 700 may be configured to implement a portion of the methods discussed herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" or "engine" is understood to encompass a tangible entity, be that an entity that is physically constructed, specifically configured (e.g., hardwired), or temporarily (e.g., transitorily) configured (e.g., programmed) to operate in a specified manner or to perform part, or all, of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a module at one instance of time and to constitute a different module at a different instance of time. A module or engine can be implemented using processing circuitry configured to perform the operations thereof.

Machine (e.g., computer system)700 may include a hardware processing circuitry 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The display unit 710 may be configured to indicate evaluated speed, wherein the evaluated speed has been evaluated as described above with reference to FIG. 1-6. The display unit 710 may provide an indication as to whether the speed is too fast or too slow, using visual indicators including lights, warning symbols, etc. The display unit 710 can comprise indicator circuitry such as a light-emitting diode (LED). The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or another sensor (e.g., EC sensor/s or coil/s 106, 108) as described earlier herein. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processing circuitry 702 during execution thereof by the machine 700. In an example, one or any combination of the hardware processing circuitry 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory computer readable media. In some examples, machine readable media may include machine readable media that is not a transitory propagating signal.

The instructions 724 may further be transmitted or received over a communications network 726 using a transmission medium via the network interface device 720. The machine 700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, a Long Term Evolution (LTE) family of standards, a Universal Mobile Telecommunications System (UMTS) family of standards, peer-to-peer (P2P) networks, among others). In an example, the network interface device 720 may include one or more physical jacks (e.g., Ethernet, coaxial, or phone jacks) or one or more antennas to connect to the communications network 726. In an example, the network interface device 720 may include a plurality of antennas for wirelessly communication.

The above detailed description includes references to the accompanying drawings, which form a part of the detailed description. The drawings show, by way of illustration but not by way of limitation, specific implementations in which the disclosure can be practiced. These implementations are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more implementations thereof), either with respect to a particular example (or one or more implementations thereof), or with respect to other examples (or one or more implementations thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a," "an," "the," and "said" are used when introducing elements of implementations of the disclosure, as is common in patent documents, to include one or more than one or more of the elements, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms ins "comprising" and "wherein." Also, in the following claims, the terms "comprising," "including," and "having" are intended to be open-ended to mean that there may be additional elements other than the listed elements, such that after such a term (e.g., comprising, including, having) in a claim are still deemed to fall within the scope of that claim. Moreover, in the following claims, the terms "first," "second," and "third," and so forth, are used merely as labels, and are not intended to impose numerical requirements on their objects.

Implementations of the disclosure may be implemented with computer-executable instructions. The computer-executable instructions (e.g., software code) may be organized into one or more computer-executable components or modules. Aspects of the disclosure may be implemented with any number and organization of such components or modules. For example, implementations of the disclosure are not limited to the specific computer-executable instructions or the specific components or modules illustrated in the figures and described herein. Other implementations of the disclosure may include different computer-executable instructions or components having more or less functionality than illustrated and described herein.

Method examples (e.g., operations and functions) described herein can be machine or computer-implemented at least in part (e.g., implemented as software code or instructions). Some examples can include a computer-readable medium or machine-readable medium encoded with instructions operable to configure an electronic device to perform methods as described in the above examples. An implementation of such methods can include software code, such as microcode, assembly language code, a higher-level language code, or the like (e.g., "source code"). Such software code can include computer readable instructions for performing various methods (e.g., "object" or "executable code"). The software code may form portions of computer program products. Software implementations of the implementations described herein may be provided via an article of manufacture with the code or instructions stored thereon, or via a method of operating a communication interface to send data via a communication interface (e.g., wirelessly, over the internet, via satellite communications, and the like).

Further, the software code may be tangibly stored on one or more volatile or non-volatile computer-readable storage media during execution or at other times. These computer-readable storage media may include any mechanism that stores information in a form accessible by a machine (e.g., computing device, electronic system, and the like), such as, but are not limited to, floppy disks, hard disks, removable magnetic disks, any form of magnetic disk storage media, CD-ROMS, magnetic-optical disks, removable optical disks (e.g., compact disks and digital video disks), flash memory devices, magnetic cassettes, memory cards or sticks (e.g., secure digital cards), RAMs (e.g., CMOS RAM and the like), recordable/non-recordable media (e.g., read only memories (ROMs)), EPROMS, EEPROMS, or any type of media suitable for storing electronic instructions, and the like. Such computer readable storage medium coupled to a computer system bus to be accessible by the processor and other parts of the OIS.

In various implementations of the disclosure, the method of creating a component or module can be implemented in software, hardware, or a combination thereof. The methods provided by various implementations of the present disclosure, for example, can be implemented in software by using standard programming languages such as, for example, C, C++, Java, Python, and the like; and combinations thereof. As used herein, the terms "software" and "firmware" are interchangeable, and include any computer program stored in memory for execution by a computer.

A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general purpose computer selectively activated or reconfigured by a computer program stored in the computer. The order of execution or performance of the operations in implementations of the disclosure illustrated and described herein is not essential, unless otherwise specified. That is, the operations may be performed in any order, unless otherwise specified, and implementations of the disclosure may include additional or fewer operations than those disclosed herein. For example, it is contemplated that executing or performing a particular operation before, contemporaneously with, or after another operation is within the scope of implementations of the disclosure.

In view of the above, it will be seen that the several objects of the disclosure are achieved and other advantageous results attained. Having described implementations of the disclosure in detail, it will be apparent that modifications and variations are possible without departing from the scope of implementations of the disclosure as defined in the appended claims. As various changes could be made in the above constructions, products, and methods without departing from the scope of implementations of the disclosure, it is intended that all matter contained in the above description and shown in the accompanying drawings shall be interpreted as illustrative and not in a limiting sense.

The above description is intended to be illustrative, and not restrictive. For example, the above-described examples (or one or more implementations thereof) may be used in combination with each other. In addition, many modifications may be made to adapt a particular situation or material to the teachings of the disclosure without departing from its scope. While the dimensions, types of materials and coatings described herein are intended to define the parameters of the disclosure, they are by no means limiting and are exemplary implementations. Many other implementations will be apparent to those of skill in the art upon reviewing the above description. The scope of the disclosure should, therefore, be determined with reference to the appended claims, along with the full scope of equivalents to which such claims are entitled.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description, with each claim standing on its own as a separate implementation. The scope of the disclosure should be determined with reference to the appended claims, along with the full scope of equivalents to which such claims are entitled.

The Abstract is provided to allow the reader to quickly ascertain the nature of the technical disclosure. It is submitted with the understanding that it will not be used to interpret or limit the scope or meaning of the claims.

What is claimed is:

1. An eddy current (EC) inspection system comprising:
   an EC probe including a first coil and a second coil to provide corresponding first and second EC response signals; and processing circuitry configured to:
   set a time window for analyzing the first and second EC response signals;
   determine a speed of the EC probe based on determining a time delay between the EC response signals based on a maximum of a cross-correlation of a noise frequency pattern of the first and second EC response signals in the time window; and
   generate a command to adjust operations of the EC probe based on the speed of the EC probe.

2. The EC inspection system of claim 1, wherein the plurality of first and second coils are wound around a round EC probe core.

3. The EC inspection system of claim 1, wherein the EC probe is a surface probe.

4. The EC inspection system of claim 1, wherein the command is to adjust the speed of the EC probe during an EC inspection.

5. The EC inspection system of claim 4, further comprising:
   control circuitry to control the speed of the EC probe responsive to receiving the command.

6. The EC inspection system of claim 1, wherein determining the speed of the EC probe includes:
   dividing a distance d between the first and second EC coils by the time delay.

7. The EC inspection system of claim 1, wherein the processing circuitry is further configured to determine a position of the EC probe by performing an integration operation based on the speed.

8. The EC inspection system of claim 7, further comprising a memory to store landmark information, and wherein the processing circuitry is further configured to verify the determined position based on the landmark information.

9. The EC inspection system of claim 1, wherein the processing circuitry is further configured to evaluate acceleration of the EC probe.

10. The EC inspection system of claim 1, wherein the processing circuitry is configured to evaluate acceleration based on information from an Inertial Measurement Unit.

11. The EC inspection system of claim 1, further comprising a filter to filter at least one of the EC response signals, and wherein the processing circuitry is further configured to adjust a cutoff frequency of the filter based on the speed.

12. The EC inspection system of claim 1, further comprising:
   indicator circuitry configured to indicate the speed.

13. The EC inspection system of claim 1, wherein the time delay is determined based on only real components of the cross-correlation.

14. A method for eddy current (EC) inspection, the method comprising:
   acquiring a first and second EC response signals from respective first and second EC coils of an EC probe;
   setting a time window for analyzing the first and second EC response signals;
   determining a speed of the EC probe based on determining a time delay between the EC response signals based on a maximum of a cross-correlation of a noise frequency pattern of the first and second EC response signals in the time window; and
   adjusting the speed of the EC probe during an EC inspection based on the determined speed.

15. The method of claim 14, wherein determining the speed of the EC probe includes:
   dividing a distance d between the first and second EC coils by the time delay.

16. The method of claim 14, further comprising:
   determining a position of the EC probe by performing an integration operation based on the speed.

17. The method of claim 16, further comprising:
   verifying the determined position based on landmark information.

18. The method of claim 14, further comprising:
   performing filtering of a signal generated during determining of the speed, wherein a cutoff frequency of the filtering is adjusted based on the speed.

19. The method of claim 14, wherein the time delay is determined based on only real components of the cross-correlation.

20. A non-transitory computer readable medium including instructions that, when implemented on a processor, cause the processor to perform operations including:
   acquiring a first and second EC response signals from respective first and second EC coils of an EC probe;
   setting a time window for analyzing the first and second EC response signals;
   determining a speed of the EC probe based on determining a time delay between the EC response signals based on a maximum of a cross-correlation of a noise frequency pattern of the first and second EC response signals in the time window; and
   adjusting the speed of the EC probe during an EC inspection based on the determined speed.

21. The non-transitory computer readable medium of claim 20, wherein the operations further include:

dividing a distance d between the EC coils by the time delay.

22. The non-transitory computer readable medium of claim 20, further comprising:
determining a position of the EC probe by performing an integration operation based on the speed.

23. The non-transitory computer readable medium of claim 22, further comprising:
verifying the determined position based on landmark information.

24. The non-transitory computer readable medium of claim 20, further comprising:
performing filtering of a signal generated during determining of the speed, wherein a cutoff frequency of the filtering is adjusted based on the speed.

25. The non-transitory computer readable medium of claim 20, wherein the time delay is determined based on only real components of the cross-correlation.

\* \* \* \* \*

UNITED STATES PATENT AND TRADEMARK OFFICE
CERTIFICATE OF CORRECTION

PATENT NO. : 11,525,805 B2
APPLICATION NO. : 16/891338
DATED : December 13, 2022
INVENTOR(S) : Leclerc et al.

It is certified that error appears in the above-identified patent and that said Letters Patent is hereby corrected as shown below:

In the Claims

In Column 11, Line 38, in Claim 1, after "signals; and", insert a linebreak

In Column 11, Line 49, in Claim 2, before "first", delete "plurality of"

Signed and Sealed this
Seventeenth Day of October, 2023

Katherine Kelly Vidal
*Director of the United States Patent and Trademark Office*